United States Patent [19]
Kim et al.

[11] Patent Number: 5,659,687
[45] Date of Patent: Aug. 19, 1997

[54] DEVICE FOR CONTROLLING MEMORY DATA PATH IN PARALLEL PROCESSING COMPUTER SYSTEM

[75] Inventors: Seong-Woon Kim; Suk-Han Yoon; Chul-Ho Won, all of Daejeon, Rep. of Korea

[73] Assignee: Electronics & Telecommunications Research Institute, Daejeon-shi, Rep. of Korea

[21] Appl. No.: 634,635

[22] Filed: Apr. 18, 1996

[30] Foreign Application Priority Data

Nov. 30, 1995 [KR] Rep. of Korea .................. 95-45771

[51] Int. Cl.⁶ .................. G06F 13/00; G06F 13/16
[52] U.S. Cl. .................. 395/292; 395/872; 395/200.64
[58] Field of Search .................. 395/292, 200.2, 395/728, 800, 200.07, 200.03, 200.14, 474, 250

[56] References Cited

U.S. PATENT DOCUMENTS

| | | | |
|---|---|---|---|
| 4,766,534 | 8/1988 | DeBenedictis | 364/200 |
| 5,001,671 | 3/1991 | Koo et al. | 365/230 |
| 5,036,459 | 7/1991 | den Haan et al. | 395/200.14 |
| 5,050,066 | 9/1991 | Myers et al. | 395/182.16 |
| 5,133,053 | 7/1992 | Johnson et al. | 395/200.03 |
| 5,179,665 | 1/1993 | Roslund et al. | 395/250 |
| 5,247,626 | 9/1993 | Firoozmand | 395/200.07 |
| 5,313,649 | 5/1994 | Hsu et al. | 395/800 |
| 5,361,262 | 11/1994 | Cheung | 370/440 |
| 5,418,967 | 5/1995 | Simcoe et al. | 395/729 |
| 5,485,586 | 1/1996 | Brash et al. | 395/292 |
| 5,511,166 | 4/1996 | Travaglio et al. | 395/200.2 |
| 5,546,546 | 8/1996 | Bell et al. | 392/292 |
| 5,588,122 | 12/1996 | Garcia | 395/250 |

FOREIGN PATENT DOCUMENTS

0523997  1/1993  European Pat. Off. .......... G11C 7/02

OTHER PUBLICATIONS

"A Tightly–Coupled Processor–Network Interface", by Dana S. Henry et al, Lab for Computer Science, Massachusetts Institute of Technology, Cambridge, MA 02139, appearing in *Association for Computing Machinery*, Oct. 12–15, 1992, pp. 111–122.

*Primary Examiner*—Gopal C. Ray
*Attorney, Agent, or Firm*—Antonelli, Terry, Stout & Kraus, LLP

[57] ABSTRACT

A memory data path controller for a large-scale parallel processing computer system in which, when a network interface and bus interface request access to a single-port memory, a dual path controller dividedly stores memory access requests in network queue and bus queue. This allows a single-port DRAM to be used as a dual-port memory device. Further, the network queue and bus queue are multi-staged to store sequential memory requests and transmit reading/writing data of the network queue or bus queue to the DRAM memory.

7 Claims, 10 Drawing Sheets

DEVICE FOR CONTROLLING MEMORY DATA PATH IN PARALLEL PROCESSING COMPUTER SYSTEM

BACKGROUND OF THE INVENTION

1. Field of the Invention

The present invention relates to a memory control for a large-scale parallel processing computer system in which processors are connected in parallel to thereby process a large amount of computer operations. In particular, the present invention relates to a device for controlling a memory data path in a parallel processing computer for effectively processing a memory access request performed through an interconnection network interface and another memory access request performed through a common bus in a processor, even with a single-port memory device.

2. Description of the Prior Art

Generally, a parallel processing computer system is constructed so that tens or hundreds of processors are connected through interconnection networks to allow each of the processors to perform its particular function, and also allow operations requiring a large amount of processing to be divided by several processors for the purpose of achieving fast performance.

Such a parallel processing computer system is capable of performing a large amount of data processing in parallel so that its performance speed becomes fast enough to implement a very complicated function such as artificial intelligence.

In the parallel processing system, a common memory mode widely used in the prior art is easy in programming because it utilizes a single address.

However, in the common memory mode, a large number of processors have a common memory so that as the number of processors increases, memory data access is concentrated, thus decreasing the system's performance. Due to this defect, the common memory mode has a limitation with regards to expanding the system, and in relation to application in a large-scale system.

For this reason, there were proposed many methods which are suitable in constructing a large-scale system as well as overcoming the conventional common memory mode. Among those methods is a message passing mode.

This message mode is constructed so that a message is transmitted via an interconnection network in order to perform communication and synchronization between processors. Referring to FIG. 1 to whose configuration such a message passing mode is applicable, a predetermined number of crossbars 120, 220, 320, 420, 530, 630 and 700 are connected in a hierarchical architecture (for instance, pyramid structure).

In this hierarchical architecture, to the respective crossbars placed at the lowest level are connected tens or hundreds of processors P (in this example, only four processors 4a, 4b, 4c and 4d are shown), a system bus 5 for transmitting a request of access to the memory by the processors, and a predetermined number of processing nodes (PN) 110a, . . . 110n having a memory 8 in which data is input or output according to the access request transmitted via system bus 5. Here, the connection of the crossbars is called interconnection network 1000.

A structure in which a plurality of processing nodes are connected to one crossbar placed at the lowest level is called a cluster, to emphasize the concept of a group of nodes. This is constructed with cluster -0 (100), cluster -1 (200), cluster -2 (300), and cluster -3 (400), as shown in FIG. 1. In other words, this structure illustrates that the plurality of processing nodes including tens or hundreds of processors are connected via the interconnection network in units of clusters. As shown in FIG. 1, clusters using 4×4 crossbars are connected hierarchically and become scalable.

In order for a one-side processing node to communicate with the other-side processing node in one cluster, merely one crossbar needs to be passed. In order for message transmission for communication with other clusters, at least two steps must be passed.

Even though the common memory mode uses a single address and is thus easily used in programming, the message passing mode is used primarily because this method improves the system's performance and thereby consumes a lower cost in maintaining synchronization, as compared with the conventional common memory mode. In addition, the message passing mode is relatively advantageous in maintaining excellent scalability characteristics.

Recently suggested processors provide a function so that a multi-processor system can be easily implemented even with simplified hardware. In order to support a large computer processing capability, several processors can be connected on one processor board. Between processors forming one processing node, a common memory mode of a symmetric multi-processor (SMP) is used.

For the connection between processing nodes, the interconnection network mode is used, and for data communication inside the processors, the common memory mode is used. This is because the transmission rate for message and delay time between connection networks required in the message transmission decrease the system's performance in a large-scale parallel processing system using the message passing mode. In other words, it is a means for improving transmission rate and delay time. Here, in the processing node or processing element, in order to apply the common memory mode, a plurality of processors and memory are incorporated, and a network interface for connecting the interconnection network is provided.

In this structure, the memory needs to have a dual port because the processors of the processing node and the interface of the processor of other processing node connected to the network access the internal memory of the processing node bidirectionally.

This is because the memory used in the common bus mode causes the bottleneck phenomenon on the bus in case requests for using the memory are performed by several processors at the same time, and the processors create intervention therebetween and causes retry for the bus access. This decreases the system's performance. In order to prevent memory concentration, interleaving is most widely used, which can be divided into a low-order interleaving and high-order interleaving. For the SMP of the common bus mode, the high-order interleaving is most widely used.

However, in the SMP structure in which several processors are connected, several processors may access one-side memory at the same time even when memory concentration is prevented by the high-order interleaving. In this case, even while one processors accesses a corresponding memory, other processor can access the memory according to the characteristic of the pended protocol bus used as the system bus. Therefore, memory access by other processors is not permitted, but memory access itself is retried. However, the above methods cause useless transmission rate of the bus, deteriorating the bus' bottleneck phenomenon.

If a multi-stage queue is put on the input stage of the memory, other memory requests arriving while the previous memory request proceeds is sequentially stored in the multi-stage queue so that the memory is made as if it accepts the memory request sequentially.

This memory to which the multi-stage queue is coupled is used to allow one processor to try memory access while another processor tries memory access to the same memory, and in addition, compensates for the time of access to the memory which is slower than the speed of the processors.

A memory device for definitely obtaining such an effect is a dual port memory, which is applied to a variety of fields. Such dual port memory has been developed deeply, and used in a multi-stage system or fast image processing.

In other words, a dual port memory or multi-port memory, which simultaneously accepts the request of access to the memory via the interconnection network interface and the request of access to the memory via the bus of the processors in the parallel processing computer system, has been applied to a system having a multi-processor of over main frame level which is proper even though it is relatively high in cost. However, such a multi-port memory structure sharply increases its cost as more processors and memory are provided.

Such a dual port memory is already in mass production, but its memory cell has a dual port so that the request of access to the memory is processed via two ports. (see Rastegar, Bahador A dual-port memory device, Patent Number: EP 0 523 997 Al, SGS-TGOMSOM Microelectronics, Inc., 16.07.92)

Such a memory sharply increases cost as its memory capacity becomes larger. Using this memory, a system can be constructed in which a message is transmitted between processors. (see Charles, J. Roslund, Microprocessor Information Exchange with updating of Messages by Asynchronous Processors using assigned AND/OR available buffers in dual port memory, U.S. Pat. No. : 5,179,665, Westinghouse Electric corp., Nov. 13, 1989)

There is a case that the single port memory may be used like a dual port memory with an external control logic. (see James T. Koo, Controller For Dual Ported Memory, U.S. Pat. No.: 5,001,671, Viteiic Corporation, Jun. 27, 1989) However, such a memory structure does not have a queue for data separately, and thus cannot perform sequential access to the memory. Accordingly, in this memory structure, its performance cannot be expected to be enhanced.

In other words, regardless of such various problems, the above-stated dual port memory devices are undesirably expensive, as compared with the single port memory. As a result, the increase of cost becomes significant when the system is made of a plurality of memories.

SUMMARY OF THE INVENTION

Therefore, it is an object of the present invention to provide a memory data path controller for a parallel processing computer system in which a relatively cheap single-port DRAM is used for a memory bank, like a dual-port DRAM.

It is another object of the present invention to provide a memory data path controller for a parallel processing computer system for enhancing the rate of transmission to send a message, thereby improving the system's performance.

In a processing node connected to an interconnection network for a parallel processing computer system, a memory data path controller of the present invention comprises a network queue for storing memory access data received/transmitted via a network interface; a bus queue for temporarily storing memory access data received/transmitted via a bus interface of a bus connected to a plurality of processors; and dual path controller means for controlling the network queue and bus queue and for arbitrating memory access of the network queue and bus queue, whereby a single port memory of the processing node connected to the interconnection network of the parallel processing computer system is controlled as a dual port.

The network queue comprises: a network reading address queue for storing the network reading addresses and their access sequence; a network reading data queue for storing memory data, according to the request by the network; a network writing address queue for storing the network writing addresses and their access sequence; and a network writing data queue for storing writing data of the network, whereby the address and data for reading/writing data from/in the memory are dividely stored and transmitted.

The bus queue comprises: a bus reading address queue for storing reading addresses and their access sequence of the bus; a bus reading data queue for storing the memory data read from the memory according to the request by the bus; a bus writing address queue for storing the bus' writing addresses and their access sequence; and a bus writing data queue for storing the bus' writing data in the memory.

The network queue and bus queue are formed in multiple stages. The queues are multi-staged in order to sequentially accept the memory request from the network or bus, and thus provide the memory fast access. Retry for memory access on the bus can be reduced by storing it in the queues, corresponding to the number of stages of the queue.

The dual path controller means comprises: a queue counter for detecting whether the network queue or bus queue is full; a queue arbiter for recognizing a memory access request input via the network interface or bus interface and, only if the queue counter is not full, controlling data transmission/reception between the network queue and network interface and between the bus queue and bus interface; an access sequencer for providing a sequence of memory access between the network queue and bus queue on basis of the memory access request sequence; and a queue arbiter for accepting the queue controller's arbitration request and for arbitrating so that the network queue or bus queue accesses the memory and reads or writes data according to priority of the access sequence of the access sequencer.

The network interface of the processing node for communication with a crossbar placed at the lowest level of the interconnection network for a parallel processing computer system is connected to the crossbar to thereby transmit or receive a memory access request to the memory having a single port.

The bus interface of the processing node transmits or receives the memory access request to the memory having a single port which is generated from many processors via the pended protocol bus. The dual path controller divides the memory access request transmitted or received via the network interface or bus interface into corresponding paths.

For one of the divided paths, there is a network queue for storing the memory access request and memory access data transmitted or received via the network interface or for transmitting the memory access request to the requestor (a processor of other processing node connected to the crossbar) of one network.

For the other path, there is a bus queue for storing the memory access request and memory access data transmitted or received via the bus interface connected to the pended protocol bus or for transmitting the memory access request to a corresponding processor of tens or hundreds of processors.

The network queue and bus queue are formed in multiple stages in order to sequentially store the memory access request from the network or bus, corresponding to the number of stages of the respective queues. In the network queue, retry for memory access can be reduced by storing it in the queues, corresponding to the number of stages of the queue. In the bus queue, when that the system bus is a pended protocol, retry for memory access to the system bus can be reduced by storing it in the queues, corresponding to the number of stages of the queue.

The network queue has an address queue for an address corresponding to the reading/writing request, and a data queue for storing data, in case that the reading/writing request is performed from the network. Likewise, the bus queue has an address queue and data queue for the reading/writing request. Here, the address queue simultaneously stores the access sequence value given by the dual path controller. The queue controller of the dual path controller receives a memory access request to the memory via the network interface or bus interface, and then requests arbitration of the queue arbiter. Here, the queue controller recognizes whether a corresponding queue is full, using the number of the queue counters incorporated in the queue controller. If the corresponding queue is not full, the queue controller indicates, to the requestor of a corresponding network or a processor connected to the bus asking the memory access request, that the request is accepted.

The pended protocol bus reduces access to the memory by other processors by preventing a corresponding requester from retrying access to the memory on the bus. Thereafter, the queue controller requests the queue arbiter for queue arbitration.

The queue arbiter performs arbitration between the queues according to the access sequence value of the access sequencer incorporated in the queue controller, and thus permits use of the data bus. The queue controller requests memory access of the memory controller.

The memory controller stores the data contained in the network queue or bus queue in the memory via the data bus according to the queue controller, or transmits the data from the memory to the network or bus via the data bus.

As described above, the present invention can be used like a dual port memory with a large capacity and a single port memory, by using the network queue or bus queue having a multi-stage queue. In other words, the present invention can be applied to a processing node or processing element of a system structure in which clusters of SMP structure are connected via the interconnection network, for instance, a system of tree structure having N×N crossbars, a system having a mesh, a system having a torus, or a system having a cube or hypercube.

In such systems, the path for transmitting data to the memory is dualized so that a data transmission request generated bidirectionally from the network and bus can be performed effectively. In addition, the present invention forms a multi-stage queue thereinside to reduce the number of re-tries on the bus and permit sequential memory accesses. As a result, the transmission rate for transmitting a message is improved to enhance the system's performance.

BRIEF DESCRIPTION OF THE ATTACHED DRAWINGS

DETAILED DESCRIPTION OF PREFERRED EMBODIMENT

Hereinafter, a preferred embodiment of the present invention will be described with reference to the attached drawings.

Figure 1:
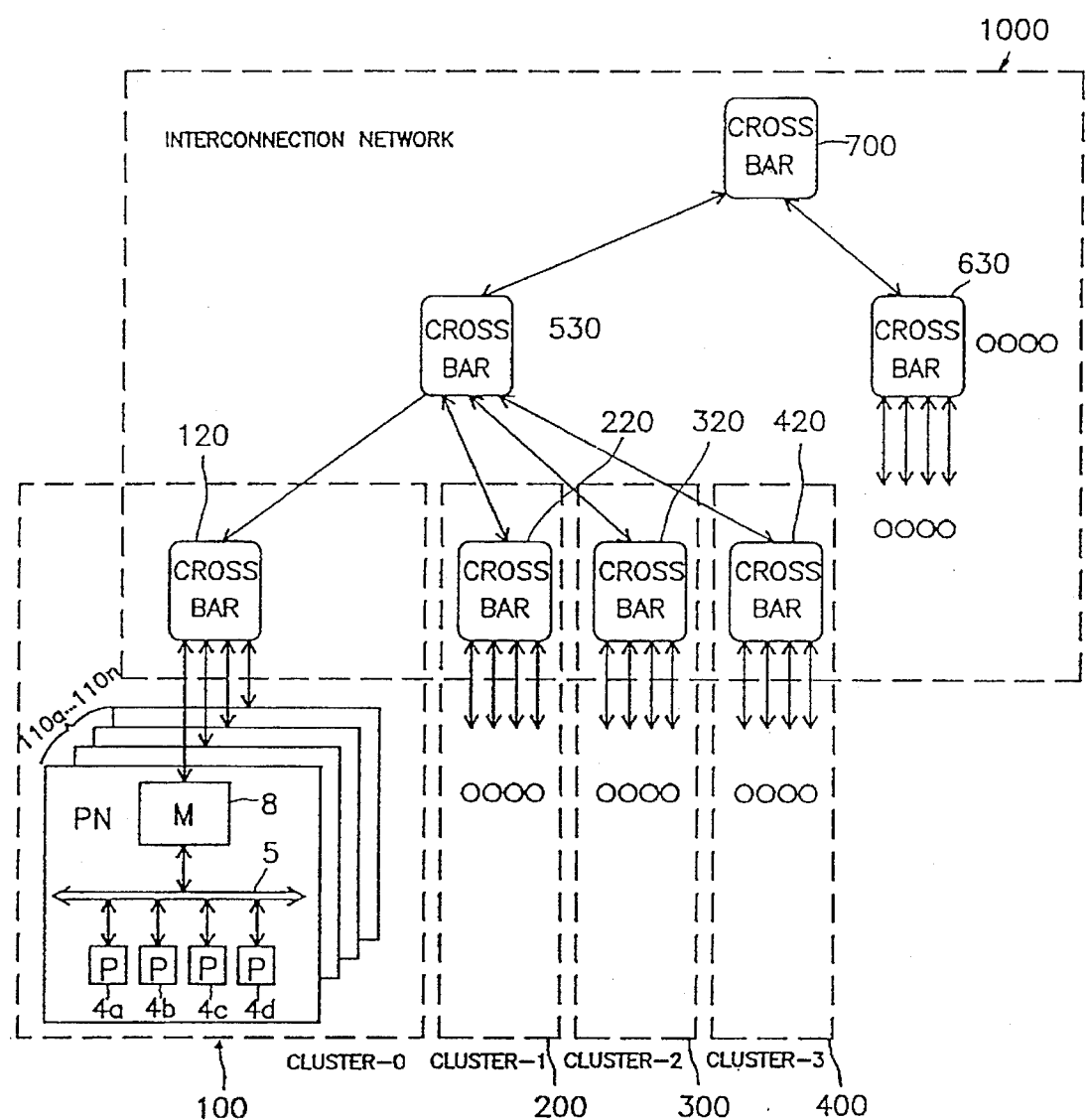
FIG. 1 illustrates an example of connection of a parallel processing computer system having a general interconnection network.
Figure 2:
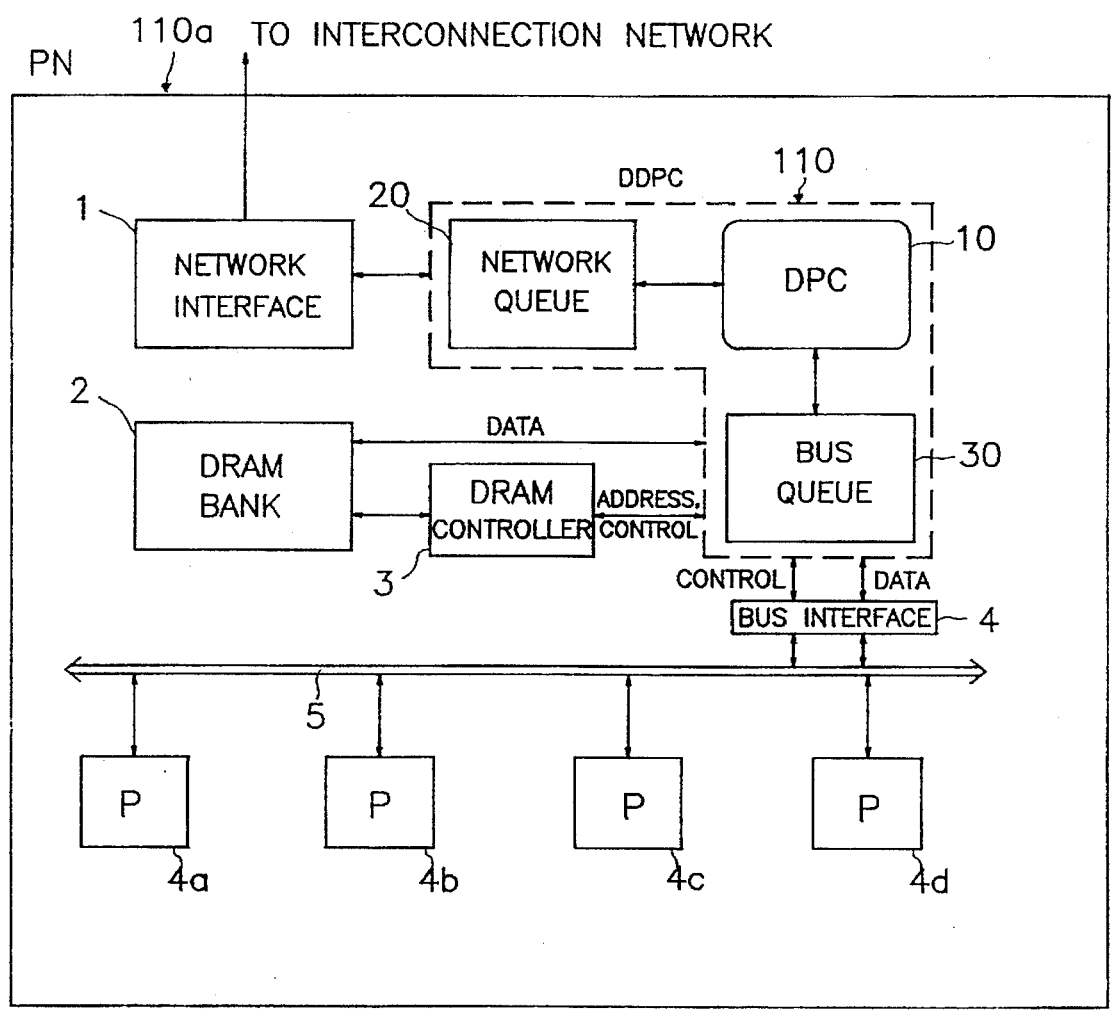
FIG. 2 illustrates an example of a processing node of a parallel processing computer system having a dual data port controller in the present invention.

Referring to FIG. 2, a typical type of symmetric multiprocessor (SMP) is shown in which several or tens of processors (in the drawings, only four processors are illustrated) 4a, 4b, 4c and 4d, and a DRAM bank are connected to a pended protocol bus 5, that is, a system bus with a pended protocol. For more detailed configuration of FIG. 2, a network interface 1 of a processing node (for example, reference number 110a) for communication with a crossbar placed at the lowest level of the interconnection network for parallel processing computer system is connected to a crossbar (for instance, reference number 120 in FIG. 1) so as to transmit or receive a memory access request to DRAM bank 2 having a single port produced from the crossbar.

A bus interface 4 of processing node 110a performs transmission/reception of memory access requests to DRAM bank 2, which are produced from processors 4a, 4b, 4c and 4d, respectively, via pended protocol bus 5, that is, the system bus.

DRAM bank 2 is designed to store or read out memory access data in dual data port controller 110 according to its control signal. Here, DRAM controller 3 accepts an address and the read/write control signal from dual data port controller 110 so as to control DRAM bank 2.

Pended protocol bus 5 is designed to not be occupied until the memory access performed by a processor currently requiring the use of the bus is completed, in order to permit sequential use of the bus. This bus structure creates the bottleneck phenomenon because all requests are performed via the bus. Therefore, in order to reduce the rate of use of the bus, a queue must be provided in the memory interface to prevent a memory access request from being retried.

In the present invention, a dual data port controller (DDPC) 110 is given to satisfy such a demand. The schematic configuration of DDPC 110 will be described below, taking an example by one of the processing nodes connected to the interconnection network (reference number 1000 in FIG. 1) for parallel processing computer system.

DDPC 110 is roughly divided into a dual path controller 10, network queue 20, and bus queue 30. Network queue 20 of processing node 110a is designed to sequentially receive an address and data request corresponding to the memory reading or writing transmitted or accepted via network interface 1. Here, the address and data corresponding to memory access (reading or writing) is required by DRAM bank 2 having a single port in processing node 110a.

According to the sequentially transmitted/received memory access request, network queue 20 temporarily stores the memory access data (including the address and data) in itself, or transmits it to network interconnection network 1000 via network interface 1. Bus interface 4 transmits or receives a control signal and data via pended protocol bus 5 connected to a plurality of processors (Ps) 4a, 4b, 4c and 4d of processing node (PN) 110a.

Bus queue 30 sequentially accepts the address and data request corresponding to the memory access (reading or writing) transmitted or received via bus interface 4. More specifically, bus queue 30 temporarily stores the data (including the address and data) of memory access to DRAM bank 2, or transmits a corresponding memory access request to one of the processors 4a, 4b, 4c and 4d via bus interface 4.

Dual path controller (DPC) 10 is connected to network interface 1 and bus interface 4, as well as to network queue 20 connected to network interface 1. The dual path controller is also connected to bus queue 30 connected to bus interface 4. Therefore, dual path controller 10 performs arbitration according to the sequence of memory access to DRAM bank 2, which is transmitted or received via network interface 1 and bus interface 4. Through such arbitration, dual path controller 10 determines whether to use the path of network queue 20 or the path of bus queue 30 according to priority. That is, dual path controller 10 selects one of the two paths through which the memory access data is transmitted, so that the path to DRAM bank 2 having a single port can be dualized. In addition, dual path controller 10 transmits to DRAM controller 3 a control signal for reading/writing data stored in DRAM bank 2. Here, DRAM controller 3 controls writing data to DRAM bank 2 or controls reading out the data from DRAM bank 2, according to the control signal of dual path controller 10. Dual path controller 10 controls transmitting data, stored respectively in network queue 20 and bus queue 30, to DRAM bank 2.

Besides DDPC 110, DRAM controller 3 of the conventional components is constructed so that if memory access is required by dual path controller 10, a signal for controlling DRAM bank 2 is generated, and the result of access to DRAM bank 2 is indicated to dual path controller 10. DRAM controller 3 has been explained schematically because it is a well-known technique, and easy to implement.

Dual path controller 10 is connected to a general DRAM control logic in order to require memory access to DRAM bank 2. As a result, dual path controller 10, connected to DRAM bank 2, divides the flow of data into two so that DRAM bank 2, having a single port, operates like a memory having a dual port. The dual path controller also performs arbitration to the memory access generated from network interface 1 or bus interface 4, and further controls network queue 20 and bus queue 30 respectively connected to the network and system bus. The operation of DDPC 110 constructed as above will be described with reference to FIGS. 4–10, after the detailed configuration of FIG. 3.

Figure 3:
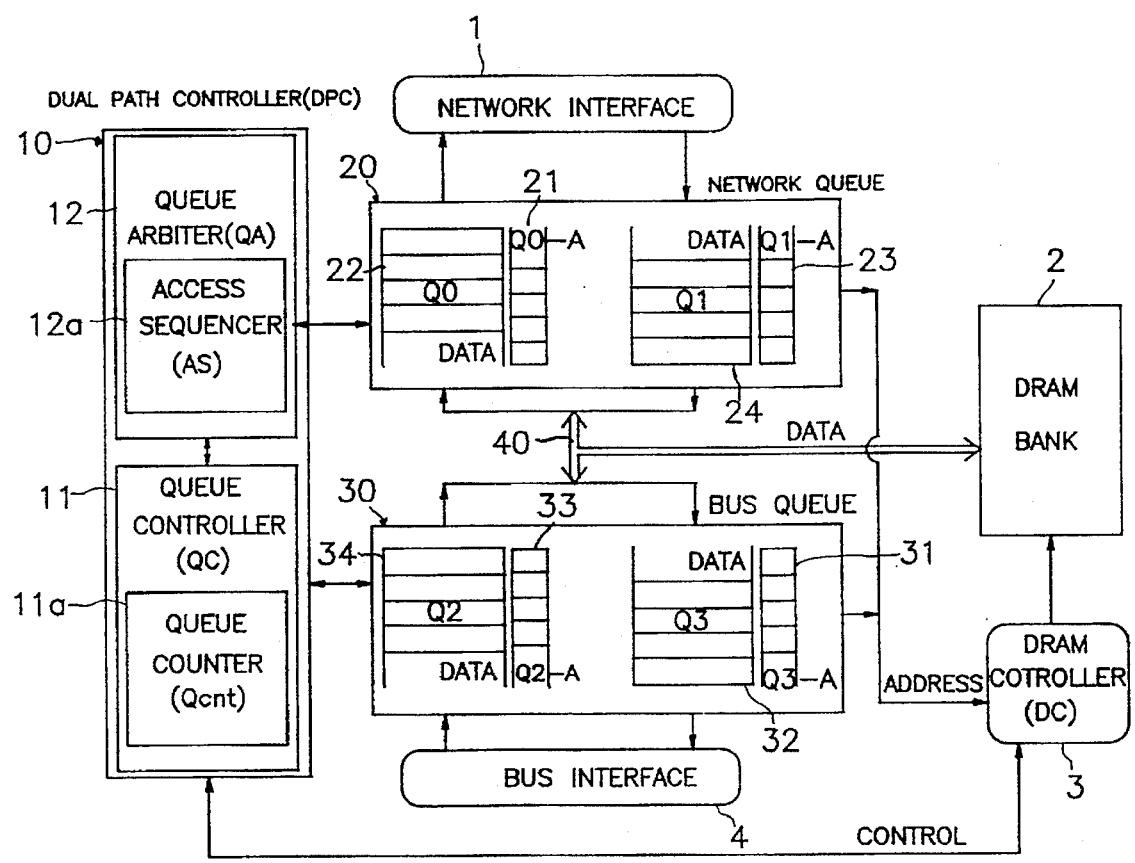
FIG. 3 illustrates an example of a detailed configuration of the dual data port controller and its peripheral devices in the present invention.

FIG. 3 illustrates the detailed configuration of DDPC 110 shown in FIG. 2, which is an example for showing the coupling of DDPC 110 and its peripheral devices. Referring to FIG. 3, dual path controller 10 is composed of a queue controller (QC) 11 having a queue counter (Qcnt) 11a therein, and a queue arbiter 12 connected to queue controller 11 having an access sequencer (AS) 12a. Dual path controller 10 is connected to network interface 1, bus interface 4, network queue 20, bus queue 30 and DRAM controller 3. The respective components of dual path controller 10 will be described below in detail.

Queue counter 11a represents whether network queue 20 or bus queue 30 is full or not, when there is recognized a request (for instance, reading or writing request) of memory access to DRAM bank 2 input via network interface 1 or bus interface 4. Here, queue counter 11a must be allocated, two for network queue 20, and two for bus queue 30, both for the purpose of writing and reading. The initial value of queue counter 11a is N, that is, the depth of the queue. As shown in FIG. 3, N becomes four because the depth of the respective queues 20 and 30 is four. The moment that an address is put into address queue (for instance, Q0-A921)), the value N is reduced by "1". Value N is increased by "1" when access to DRAM bank 2 is completed. When value N becomes "0", this indicates that queues 20 and 30 are full.

Queue controller 11, equipped with queue counter 11a, requires queue arbiter 10 to arbitrate the memory access request in network queue 20 or bus queue 30, when queue counter 11a is not completely full. Queue controller 11 also gives to DRAM controller 3 a control signal for writing to or reading from DRAM bank 2.

Access sequencer 12a incorporated in queue arbiter 12 gives the sequence of memory data access to DRAM bank 2 according to the arbitration request of queue controller 11. Accordingly, queue arbiter 12 arbitrates the path through which data is temporarily stored in network queue 20 or bus queue 30, according to the priority of the access sequence given by access sequencer 12a. Through this queue arbitration, queue arbiter 12 allows data stored in network queue 20 or bus queue 30 to be transmitted to DRAM bank 2, and permits the use of data bus 40 for storing data to network queue 20 or bus queue 30 from DRAM bank 2. From now on, network queue 20 and bus queue 30 will be described.

In the embodiment of the present invention, queues 20 and 30 are formed in multiple stages, that is, four stages. Network queue 20 can reduce the number of re-tries for the memory access to DRAM bank 2 by sequentially storing it, corresponding to the number of stages of the queues.

Likewise, when the system bus is a pended protocol, bus queue 30 can reduce the number of re-tries for the access to the bus, by sequentially storing it to the queues, corresponding to the number of stages.

It is efficient that the respective depths of network queue 20 and bus queue 30 are equal to or greater than the requestors which requires memory access to DRAM bank 2.

Network queue 20 consists of network reading address queue 21, network reading data queue 22, network writing address queue 23, and network writing data queue 24. The network queue 20 is connected to network interface 1, dual path controller 10, DRAM controller 3, and DRAM bank 2, respectively. Here, network queue 20 and DRAM bank 2 are connected with each other via data bus 40 in order to transmit/receive memory access data. The components of network queue 20 will be described below in detail.

First of all, network reading address queue 21 stores an address for reading desired data of DRAM bank 2 input via network interface 1, and at the same time, stores a sequence value corresponding to the access sequence of this reading address.

Network reading data queue 22 stores data read from DRAM bank 2 via data bus 40 according to the sequence of the access sequence value stored in network reading address queue 21, and then transmits the stored data to network interface 1. Network writing address queue 23 stores an address for writing data to DRAM bank 2 via network interface 1, and simultaneously stores a sequence value corresponding to the access sequence of the writing address.

Network writing data queue 24 stores data corresponding to the writing address via data bus 40 according to the sequence of the access sequence value stored in network writing address queue 23, and then writes the stored data in DRAM bank 2.

Meanwhile, bus queue 30 consists of bus reading address queue 31, bus reading data queue 32, bus writing address queue 33, and bus writing data queue 34. Bus queue 30 is connected to bus interface 4, dual path controller 10, DRAM controller 3, and DRAM bank 2. Here, like network queue 20, bus queue 30 and DRAM bank 2 are connected to each other via data bus 40, and transmit/receive the memory access data. Bus queue 30 will be explained below in more detail.

First, bus reading address queue 31 stores an address for reading corresponding data of DRAM bank 2 input via bus interface 4, and at the same time, stores a sequence value corresponding to the access sequence of the reading address.

Bus reading data queue 32 stores data read from DRAM bank 2 via data bus 40 according to the sequence of the access sequence value stored in bus reading address queue 31, and then transmits the stored data to bus interface 4. Bus writing address queue 33 stores an address for writing corresponding data of DRAM bank 2 via bus interface 4, and at the same time, stores a sequence value corresponding to the access sequence of the writing address.

Bus writing data queue 34 stores data corresponding to the writing address via data bus 40 according to the sequence of the access sequence value stored in bus writing address queue 33, and then writes the stored data in DRAM bank 2. The address queues 21, 23, 31, and 33 of network queue 20 and bus queue 30 transmit a corresponding address signal to DRAM controller 3. Therefore, DRAM controller 3 controls the memory access to DRAM bank 2 by this address signal and the control signal transmitted from queue controller 11.

From now on, the operation of the present invention will be described schematically.

Queue controller 11 of dual path controller 10 recognizes the request of memory access (for reading or writing) to DRAM bank 2 from a processor, which is one (or both) of the requestors connected to the interconnection network or pended protocol bus 5, via network interface 1 or bus interface 4.

When the memory access request is recognized via network interface 1 for reading DRAM bank 2, queue controller 11 stores a corresponding address to network reading address queue (Q0-A) 21. If the request is for writing data in DRAM bank 2, a corresponding address is stored in network writing address queue (Q1-A) 23.

Prior to this operation, queue controller 11 must store the corresponding address to the respective address queues 21 and 23 after confirming that they are full, based on the counting value of queue counter 11a. Thereafter, queue controller 11 requires queue arbiter 12 to arbitrate, in order to find out whether the memory access request arrives first via network interface 1 or bus interface 4. Queue arbiter 12 performs arbitration according to the sequence value of access sequencer 12a incorporated in queue arbiter 12. After the queue arbitration, queue arbiter 12 permits the use of data bus 40 according to the access sequence.

Queue controller 11 transmits the respective address signals stored in network reading address queue 21 and network writing address queue 23 to DRAM controller 3. Simultaneously, queue controller 11 transmits a reading or writing control signal to DRAM controller 3. Then, DRAM controller 3 transmits the address signal and reading or writing control signal to DRAM bank 2 so that data is written in or read out from DRAM bank 2. When DRAM bank 2 is ready for reading or writing, queue controller 11 reads out the data of DRAM bank 2 via data bus 40, and then stores it in network reading data queue (Q0) 22. Further queue controller 11 writes the data stored in network writing data queue (Q1) 24 in DRAM bank 2 via data bus 40.

Meanwhile, if the memory access request is recognized via bus interface 4, and this is for reading DRAM bank 2, queue controller 11 stores a corresponding address to bus reading address queue (Q3-A) 31. If the request is for writing data in DRAM bank 2, the corresponding address is stored in bus writing address queue (Q2-A) 23.

Prior to this operation, queue controller 11 must store the corresponding address to the respective address queues 31 and 33 after confirming that they are full, based on the counting value of queue counter 11a. Thereafter, queue controller 11 requires queue arbiter 12 to arbitrate, in order to find out whether the memory access request arrives first via network interface 1 or bus interface 4. Queue arbiter 12 performs arbitration according to the sequence value of access sequencer 12a incorporated in queue arbiter 12. After the queue arbitration, queue arbiter 12 permits the use of data bus 40 according to the access sequence.

Queue controller 11 transmits the respective address signals stored in bus reading address queue 31 and bus writing address queue 33 to DRAM controller 3. Simultaneously, queue controller 11 transmits a reading or writing control signal to DRAM controller 3. Then, DRAM controller 3 transmits the address signal and reading or writing control signal to DRAM bank 2 so that data is written in or read out from DRAM bank 2. When DRAM bank 2 is ready for reading or writing, queue controller 11 reads out the data of DRAM bank 2 via data bus 40, and then stores it in bus reading data queue (Q3) 32. Besides this, queue controller 11 writes the data stored in bus writing data queue (Q2) 34 in DRAM bank 2 via data bus 40. In the above-stated embodiment, the memory request is performed in different cycles from network interface 1 and bus interface 4. However, this memory access request may be performed simultaneously from network interface 1 and bus interface 4. If so, queue arbiter 12 gives priority to bus interface 4. Reading and writing cannot be performed at the same in network interface 1 and bus interface, respectively. The priority will be described later in detail.

The queue controlling operation by queue controller 11 of DDPC 110 will be explained below in detail with reference to FIGS. 4–8.

Figure 4:
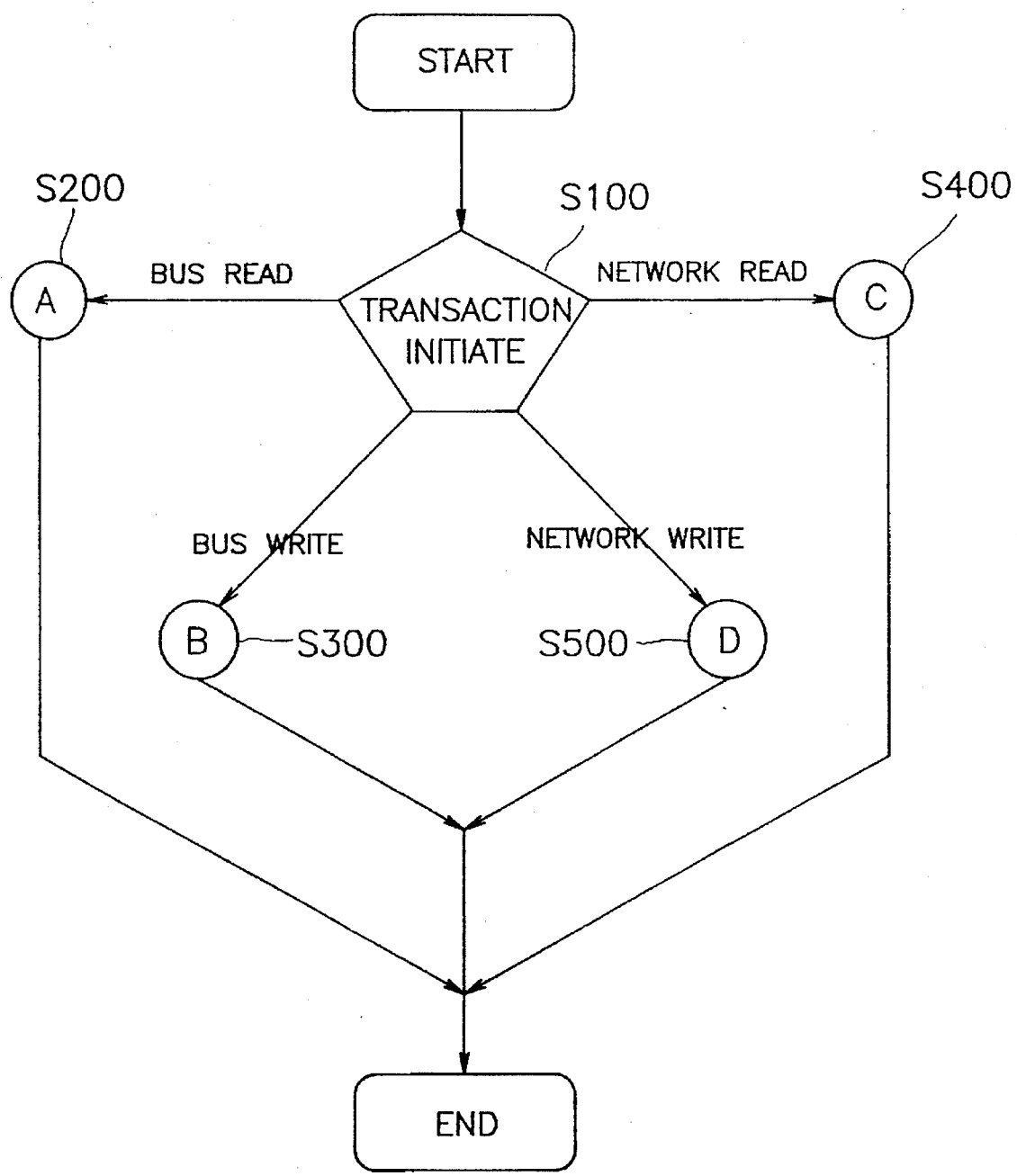
FIG. 4 is a flowchart for the whole operation of queue control in the queue controller in FIG. 3.
Figure 5:
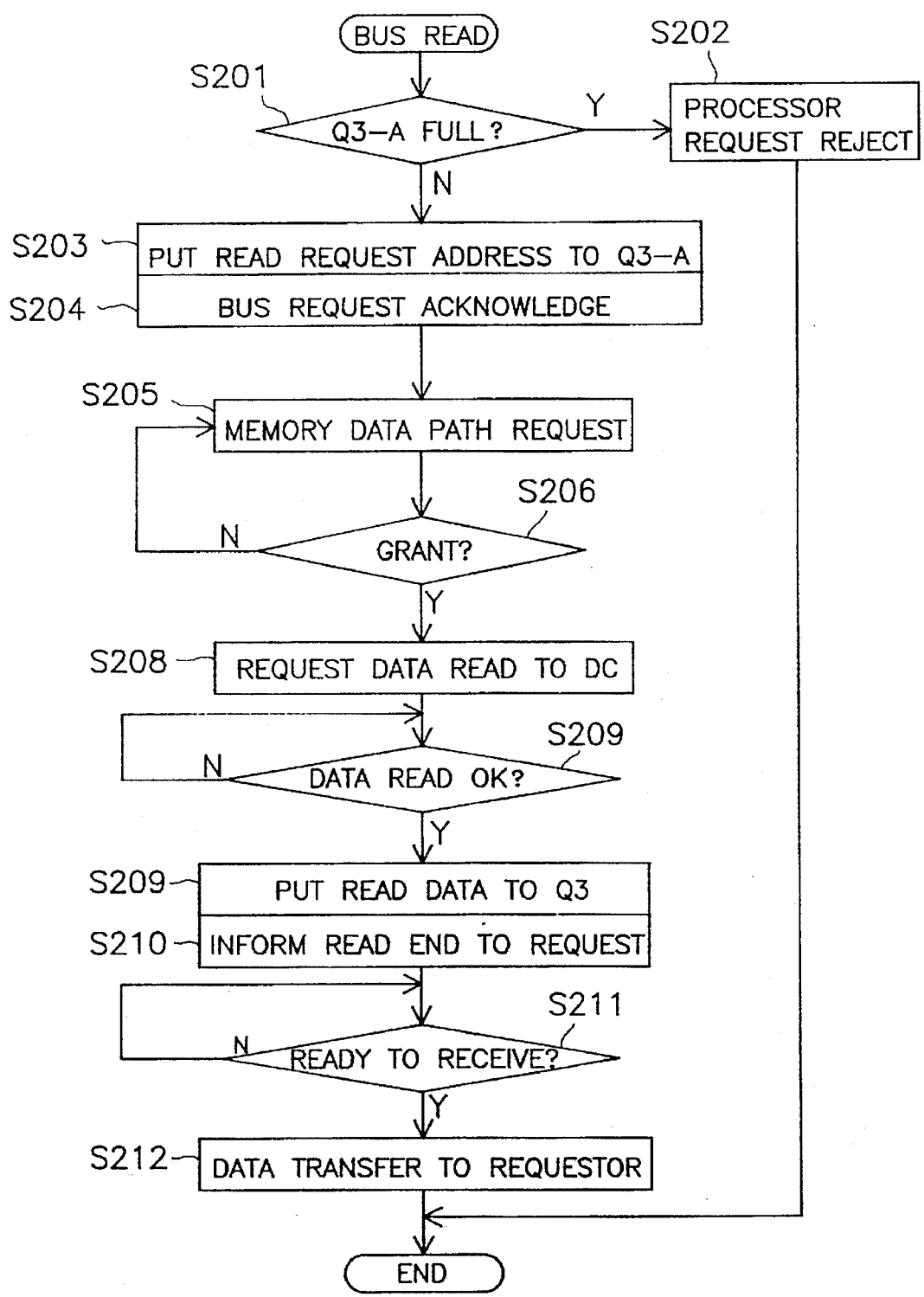
FIG. 5 is a flowchart of the operation shown in FIG. 4 for a reading transaction on a bus.
Figure 6:
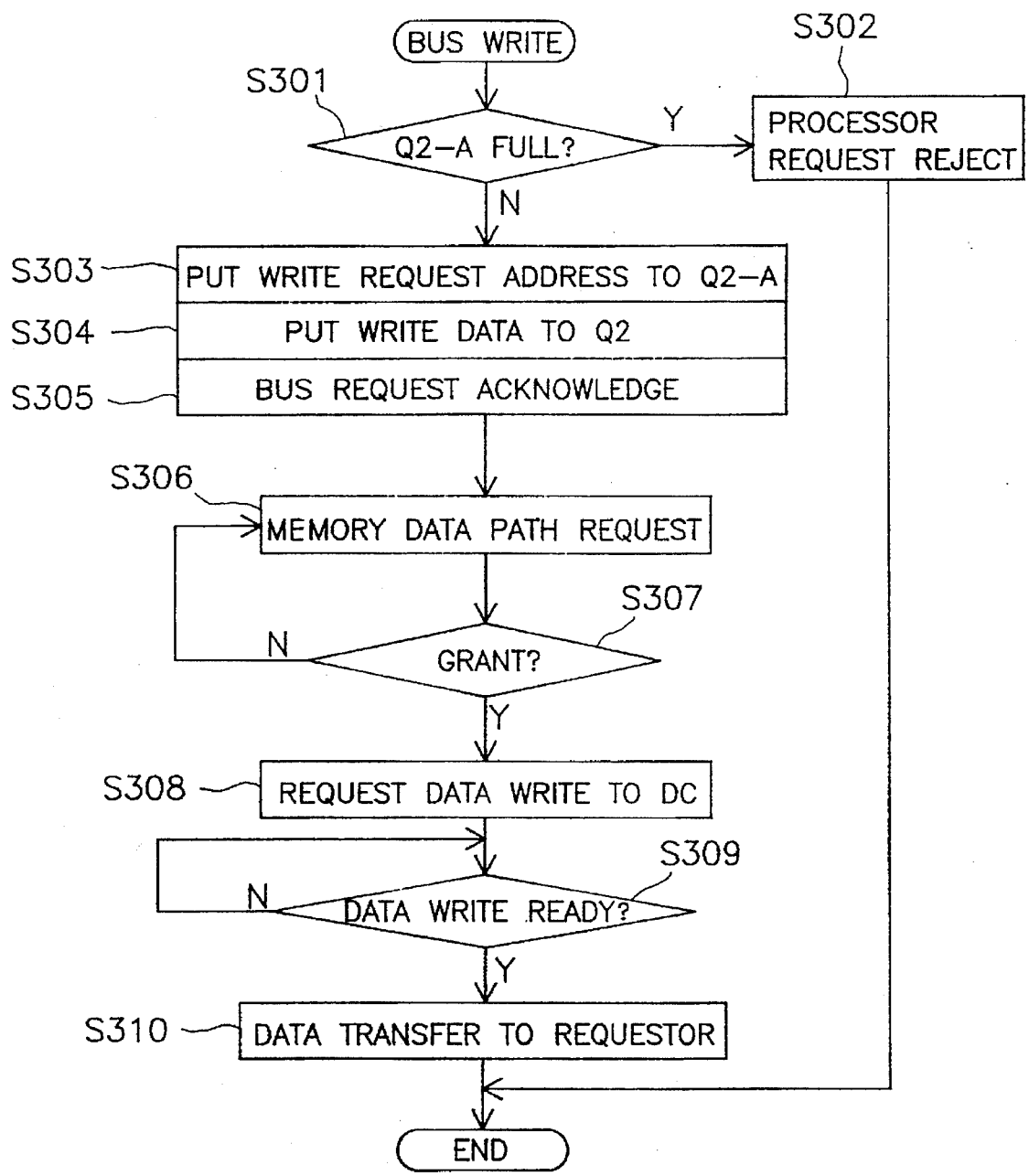
FIG. 6 is a flowchart of the operation shown in FIG. 4 for a writing transaction on a bus.
Figure 7:
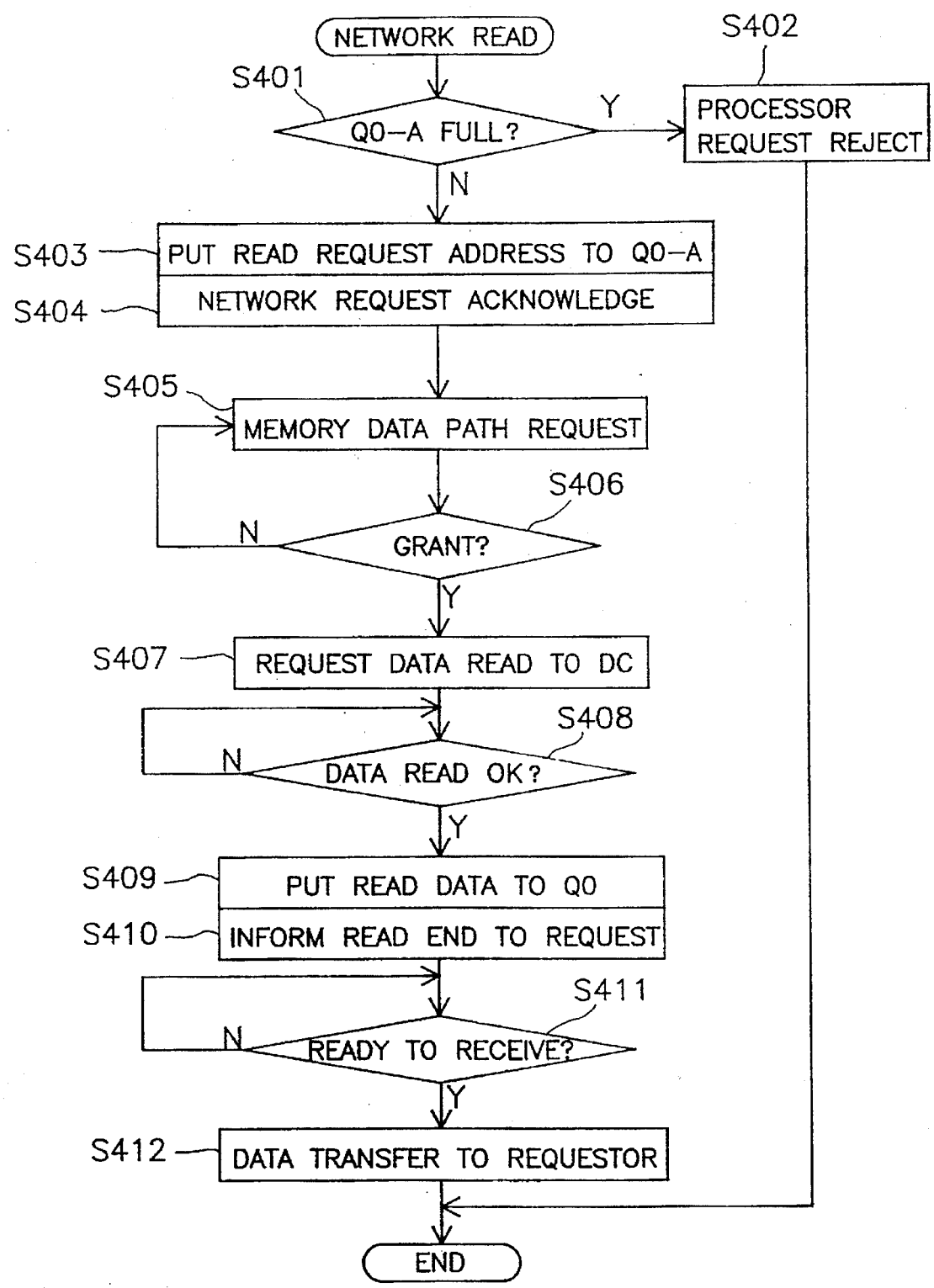
FIG. 7 is a flowchart of the operation shown in FIG. 4 for a reading transaction on a network.
Figure 8:
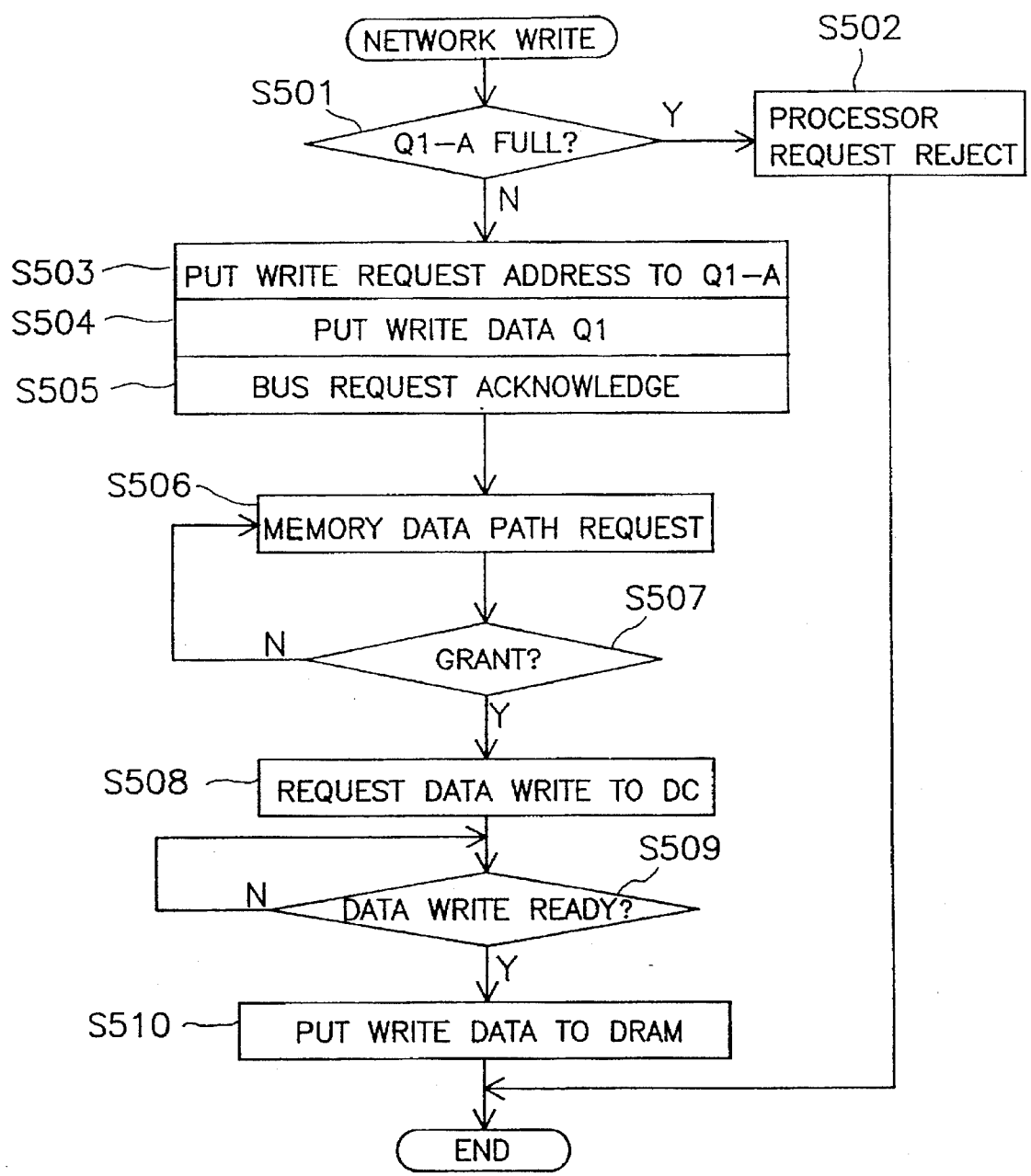
FIG. 8 is a flowchart of the operation shown in FIG. 4 for a writing transaction on a network.

FIG. 4 shows a flowchart for the whole operation of queue control in queue controller 11 shown in FIG. 3. FIG. 5 shows a flowchart for the operation of FIG. 4 for a reading transaction on the bus. FIG. 6 shows a flowchart for the operation of FIG. 4 for a writing transaction on the bus. FIG. 7 shows a flowchart for the operation of FIG. 4 for a reading transaction on the network. FIG. 8 shows a flowchart for the operation of FIG. 4 for a writing transaction on the network. First of all, FIG. 4 will be explained below.

When the transaction starts, step S100 detects the type of corresponding transaction. Here, if the transaction type is determined as reading transaction on the side of bus, step S100 moves to step S200 in order to perform the operation shown in FIG. 5. If a writing transaction is determined to be performed on the bus, step S100 moves to step S300 in order to perform the operation shown in FIG. 6. If the type of transaction is determined to be a reading transaction on the network, step S100 moves to step S400 in order to perform the operation shown in FIG. 7. Finally, if a writing transaction is determined to be performed on the network, step S100 moves to S500 in order to perform the operation shown in FIG. 8. When the flow of the respective transactions is completed, the operation of queue controller 11 is finished.

For the operation of a reading transaction on the bus, referring to FIG. 5, queue controller 11 confirms in step S201 whether or not bus reading address queue (Q3-A) 31 connected to bus interface 4 is completely full. This can be indicated by queue counter 11a. If bus reading address queue 31 is completely full, a previous transaction is under way so that no more transactions can be accepted. In this case, a request by any processor cannot be processed any more in step S202, and the transaction is finished. Here, a retry must be performed by a corresponding processor. If the depth of the queues is sufficiently greater than the number of processors (requestors), such situation described above is not caused.

Meanwhile, if bus reading address queue 31 is not completely full in step S201, the reading address request generated via bus interface 4 is put into bus reading address queue 31 in step S203. Bus reading address queue 31 or bus writing address queue (Q2-A) 33 is a device for temporarily storing the request on the bus proceeding by the processors, and thus stores memory access addresses. Besides addresses, queues 31 and 33 store a sequence value established by the access sequencer. This sequence value is used for proceeding memory access by queue arbiter 12 according to a sequence in which it is input into the queues. The address of the respective queues 31 and 33 is used to access DRAM bank 2.

In step S204, queue controller 11 informs a processor requiring memory access that the request is accepted. In this case, pended protocol bus 5 causes the processor to not occupy the bus any more. From this moment, the bus may be used by other processors.

The moment that the address is put into bus reading address queue 31, in step S205, queue controller 11 requests queue arbiter 12 for the use of bus 40 for DRAM access. In step S206, queue arbiter 12 arbitrates the requests by the queues, and permits the use of bus if it is possible. The time to use the data bus is necessary for as long as access DRAM bank 2 requests. This time cannot be used overlappingly because DRAM bank 2 itself is not dual port.

When the use of data bus 40 is permitted, queue controller 11 requests DRAM controller 3 for DRAM access in step S207. Then, step S208 waits to finish data access. When the read data appears on data bus 40, queue controller 11 stores it in bus reading data queue (Q3) 32. In step S210, it is indicated that data transmission to the processor requiring data is finished. In step S211, queue controller 11 confirms that the processor is ready to read out the data.

If so, queue controller 11 transmits the data via pended protocol bus 5 in step S212.

From now on, the operation of writing on the side of bus will be described with reference to FIG. 6. First of all, queue controller 11 confirms in step S301 whether bus writing address queue (Q2-A) 33 is completely full or not.

If so, step S302 cannot process the request by the processor, and finishes the transaction. If bus writing address queue 33 is not full, the bus writing address request is put into bus writing address queue 33. Then, the writing data transmitted from the processor is written in bus writing data queue (Q2) 34 in step S304.

After writing all the writing data transmitted from the processor in bus writing data queue 34, in step S305, queue controller 11 informs the processor that data writing is finished. After writing data in bus writing data queue 34, in step S306, queue arbiter 12 is required to arbitrate the queues in order to use data bus 40. Accordingly, queue arbiter 12 performs arbitration, and permits the use of data bus 40 in step S307.

Queue controller 11 asks DRAM controller 3 to write data in DRAM bank 2 in step 308. If DRAM bank 2 is ready to write data in step S309, DRAM controller 3 drives data of bus writing data queue 34 so that a corresponding data value is transmitted to DRAM bank 2 in step S310. Hereinbefore, reading and writing transactions on the side of bus have been described.

Referring to FIG. 7, the reading transaction on the side of network is performed when the memory reading access to DRAM bank 2 is tried via the interconnection network.

The memory access via the interconnection network is characterized in that the number of requests are less but a lot of memory access is needed at once. If a request of reading transaction on the side of network is input, in step S401, queue controller 11 confirms whether network reading address queue 21 is completely full.

If so, step S402 cannot process the request by the network any more, and finishes the transaction. Here, the reading request from the network waits for network reading address queue 21 to become empty. If network reading address queue 21 is not full, the address reading request from the network is put into network reading address queue (Q0-A) 21 in step S403.

In step S404, queue controller 11 informs the requestor of the network requesting the memory access that the address reading request is accepted. Here, pended protocol bus 5 causes the processor to not occupy the bus any more. From this point, pended protocol bus 5 can be used by other processors.

The moment that addresses are input to network reading address queue 21, in step S405, queue controller 11 requests queue arbiter 12 for the use of data bus 40 for access to DRAM bank 2. Queue arbiter 12 arbitrates the queue requests, and if the use of data bus 40 is permitted, requires memory access to DRAM bank 2 in step S407. Step S408 waits until the memory access is finished.

Thereafter, when the data read from DRAM bank 2 appears via data bus 40, queue controller 11 stores the read data in network reading data queue (Q0) 22. Step S410 indicates that data transmission is finished on the side of network requiring data.

Queue controller 11 confirms in step S411 whether the network requestor is ready to read data. If so, the queue controller transmits data to the network requestor in step S412. The operation of writing transaction will be described below with reference to FIG. 8.

Queue controller 11 confirms in step S501 whether network writing address queue (Q1-A) 23 is full. If so, step S502 cannot process the request by the processor any more, and ends the transaction. If the network writing address queue 23 is not full, the address writing request is put into network writing address queue (Q1-A) 23. Then, the writing data transmitted from the network is written in network writing data queue (Q1) 24 in step S504.

After writing all the writing data transmitted from the network in network writing data queue 24, in step S505, it is informed that data writing is finished in the network. After writing data in network writing data queue 24, in step S506 queue arbiter 12 is required to arbitrate the queues in order to use data bus 40. Accordingly, queue arbiter 12 performs arbitration, and permits the use of data bus 40 in step S507.

Queue controller 11 requests DRAM controller 3 to write data in DRAM bank 2 in step 508. If DRAM bank 2 is ready to write data in step S509, DRAM controller 3 drives data of network writing data queue 24 so that a corresponding data value is transmitted to DRAM bank 2 in step S510. Hereinbefore, the operation of queue controller 11 of the present invention has been described.

From now on, the operation of access sequencer 12a for storing information necessary to perform queue arbitration will be described with reference to FIG. 9.

Access sequencer 12a is designed to give a sequence to memory accesses to DRAM bank 2 so that they are performed according to the sequence given.

As shown in FIG. 3, for memory access, requests can be made from four locations. These requests have the following rules.

(1) The respective memory access requests may occur repeatedly for every clock.
(2) Reading and writing are not requested of the bus at the same time.
(3) Reading and writing of the network are not requested at the same time.
(4) The interval between requests on the bus is at least two clocks.
(5) The interval between requests on the network is at least two clocks.
(6) Reading of the bus and reading of the network may occur at the same time.
(7) Reading of the bus and writing of the network may occur at the same time.
(8) Writing of the bus and reading of the network may occur at the same time.
(9) Writing of the bus and writing of the network may occur at the same time.
(10) If requests occur both by the bus and network, priority is given to the bus.

The above rules are the basis for the operation of access sequencer 12a, and the flow of the sequencer proceeds on the basis thereof. The flow of the access sequencer is as follows. IDLE state (S600): waits for a memory access request to be externally entered. When a memory reading request is entered from the network, the state is converted into state Q0 (S610). When a memory writing request is entered from the network, the state is converted into state Q1 (S620). When a memory reading request is entered from the bus, the state is converted into state Q3 (S640). When a memory writing request is entered from the bus, the state is converted into state Q2 (S630).

In this state, memory access requests may be entered at the same time. If the network's memory reading request and the bus' memory writing request are entered at the same time, the state is converted into states Q0 and Q2 (S650). If the network's memory reading request and the bus memory reading request are entered at the same time, then the state is converted into states Q0 and Q3 (S660). If the network's memory writing request and the bus' memory writing request are entered at the same time, then the state is converted into states Q1 and Q2 (S670). If the network's memory writing request and the bus' memory reading request are entered at the same time, then the state is converted into states Q1 and Q3 (S680). If there is no memory request, IDLE state (S600) is maintained.

Figure 9:
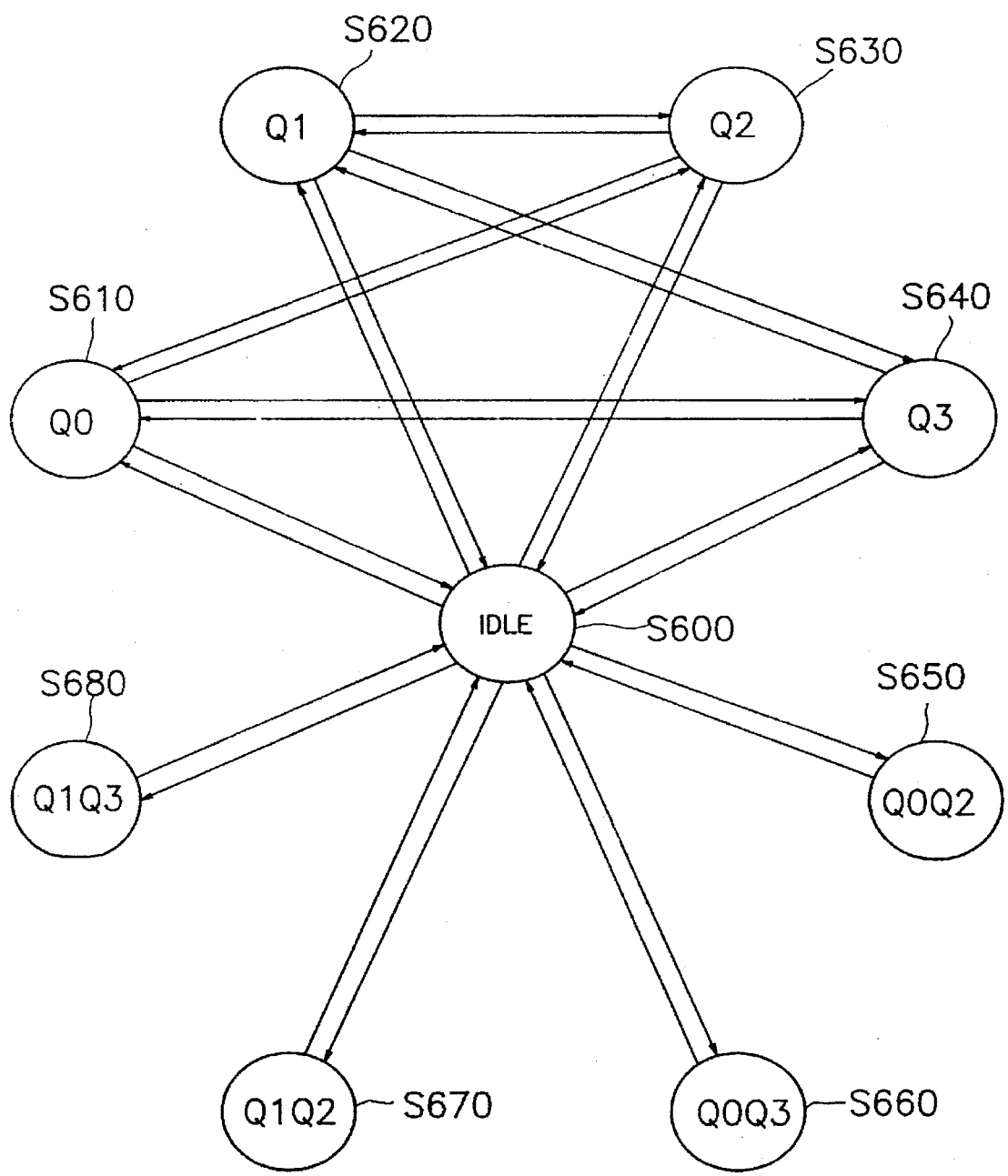
FIG. 9 is a flowchart of operation for storing information necessary for queue arbitration in the access sequencer of FIG. 3 of the present invention.

In the above operations, the respective steps are performed as follows, as seen in FIG. 9.

state Q0 (S610): Queue counter 11a of access sequencer 12a is increased by "1" so that this increased value is written in queue 21 the moment network reading address queue (Q0-A) 21 is queued. In this state, if the memory writing request is input from the network, the state is transited to state Q2 (S630). If the memory reading request is entered from the network, the state is transited to state Q3 (S640). If there is no request, the state is transited to the IDLE state (S600).

state Q1 (S620): Queue counter 11a of access sequencer 12a is increased by "1" so that this increased value is written in queue 23 the moment network writing address queue (Q1-A) 23 is queued. In this state, if the memory writing request is input from the network, the state is transited to state Q2 (S630). If the memory reading request is entered from the network, the state is transited to state Q3 (S640). If there is no request, the state is transited to the IDLE state (S600).

state Q2 (S630): Queue counter 11a of access sequencer 12a is increased by "1" so that this increased value is written in queue 33 the moment bus writing address queue (Q2-A) 33 is queued. In this state, if the memory writing request is input from the bus, the state is transited to state Q1 (S620). If the memory reading request is entered from the network, the state is transited to state Q3 (S640). If there is no request, the state is transited to the IDLE state (S600).

state Q3 (S640): Queue counter 11a of access sequencer 12a is increased by "1" so that this increased value is written in queue 31 the moment bus reading address queue (Q3-A) 31 is queued. In this state, if the memory writing request is input from the bus, the state is transited to state Q1 (S620). If the memory reading request is entered from the bus, the state is transited to state Q0 (S610). If there is no request, the state is transited to the IDLE state (S600).

state Q0Q2(S650): Queue counter 11a of access sequencer 12a is increased by "1" so that this increased value is written in bus writing address queue (Q2-A) 33. Queue counter 11a of access sequencer 12a is increased by "2" so that this increased value is written in network reading address queue (Q0-A) 21. This state is transited directly to the IDLE state (S600).

state Q0Q3(S660): Queue counter 11a of access sequencer 12a is increased by "1" so that this increased value is written in bus reading address queue (Q3-A) 31. Queue counter 11a of access sequencer 12a is increased by "2" so that this increased value is written in network reading address queue (Q0-A) 21. This state is transited directly to the IDLE state (S600).

state Q1Q2(S670): Queue counter 11a of access sequencer 12a is increased by "1" so that this increased value is written in bus writing address queue (Q2-A) 33. Queue counter 11a of access sequencer 12a is increased by "2" so that this increased value is written in network writing address queue (Q1-A) 23. This state is transited directly to the IDLE state (S600).

state Q1Q3(S680): Queue counter 11a of access sequencer 12a is increased by "1" so that this increased value is written in bus reading address queue (Q3-A)

31. Queue counter 11a of access sequencer 12a is increased by "2" so that this increased value is written in network writing address queue (Q1-A) 23. This state is transited directly to the IDLE state (S600).

In access sequencer 12a operating as above, its primary purpose is to precisely maintain the value of the queue counter. As explained above, if requests are input for the respective queues, access sequencer 12a inputs the value of queue counter 11a to the respective address queues, and at the same time, stores the counter value in the queues of access sequencer 12a in order. Suppose that queue counter 11a has N-stage queues, the number of bits required to form the counter is expressed in the following formula (1)

$$N_{cnt} \leq \log_2 (N \times 4) \quad (N_{cnt}\text{:integer}) \qquad \text{formula (1)}$$

Therefore, as shown in FIG. 3, a four-bit counter is used in a four-stage queue.

Figure 10:
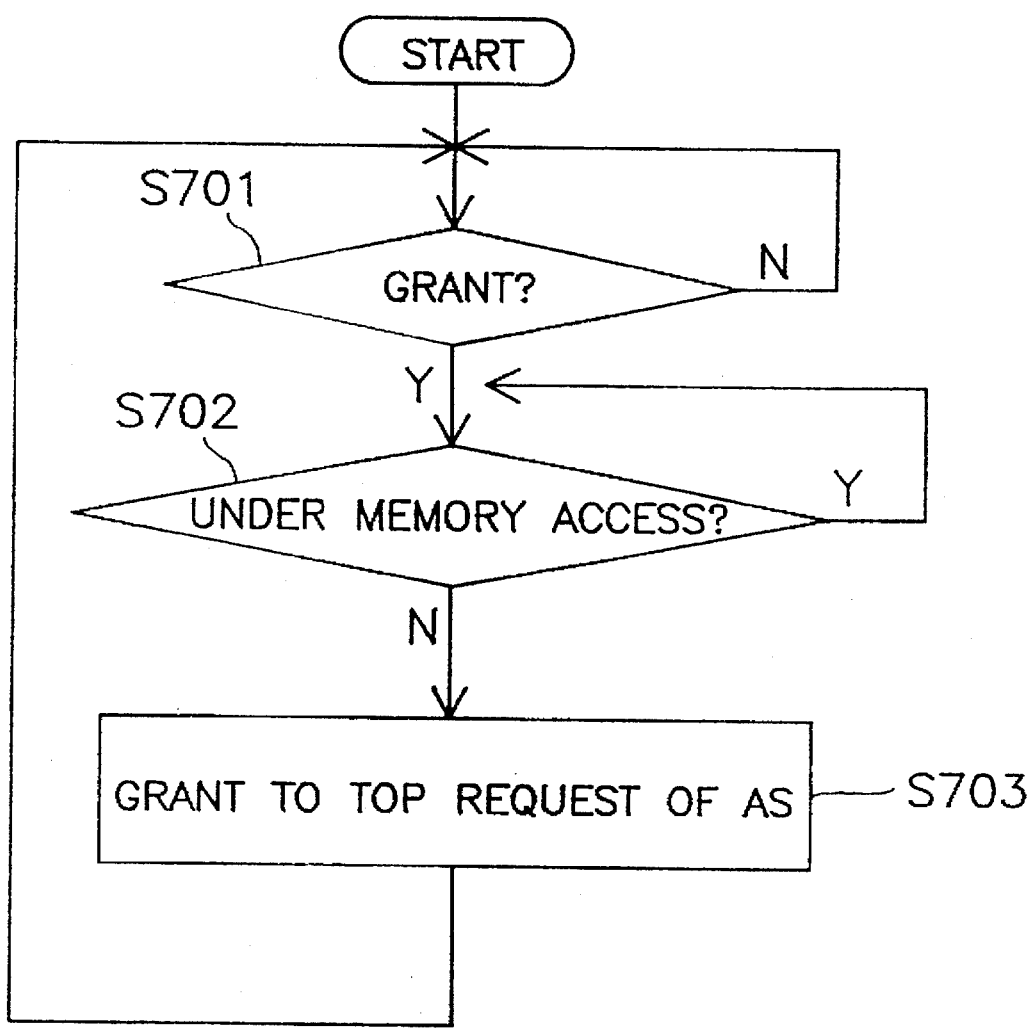
FIG. 10 is a flowchart of the operation for queue arbitration of the queue arbiter shown in FIG. 3.

The operation of access sequencer 12a operating as above and the flowchart of queue arbiter 12 for queue arbitration will be described below with reference to FIG. 10.

Queue arbiter 12 arbitrates the memory access request entered from queue controller 11. The time necessary for once request of access to DRAM bank 2 cannot be used overlappingly. When the memory request is stored in the address queue in queue controller 11, the counter value is also stored by access sequencer 12a so that queue controller 12 permits the memory access according to the queuing sequence of access sequencer 12a.

When the memory access request is generated to DRAM bank 2 by queue controller 11 in step S701, queue arbiter 12 detects in step S702 whether the previous memory access is under way.

If the previous memory access is proceeding, finishing this access waits. If the previous memory access is finished or not under way, queue arbiter 12 permits memory access starting from a memory access in which the highest of the queue of access sequencer 12a coincides with the counter value contained in the address queue of access sequencer 12a asking memory access. By doing so, the memory requests are given a sequence by access sequencer 12a, and permitted by queue arbiter 12 to access the memory according to the sequence.

In the parallel processing computer system of the present invention, the memory data path controller can be used like a dual-port memory device even with a single-port DRAM, thereby reducing the installation cost of the system. Furthermore, this allows higher data processing capability with a lower cost. Multi-stages queues make memory access fast, and reduce re-tries for the memory access.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed:

1. In a processing node connected to an interconnection network for a parallel processing computer system, a memory data path controller comprising:

a network queue for temporarily storing memory access data received/transmitted via a network interface;

a bus queue for temporarily storing memory access data received/transmitted via a bus interface of a bus connected to a plurality of processors of said processing node; and dual path controller means for recognizing memory access requests generated from both said network interface and said bus interface to thereby dually control memory access data reception/transmission between said network queue and said network interface and between said bus queue and bus interface, said means further arbitrating said memory access requests of said network queue and bus queue, whereby a single port memory of said processing node connected to the interconnection the network of said parallel processing computer system is controlled as a dual port.

2. A memory data path controller for a parallel processing computer system as claimed in claim 1, wherein said network queue comprises:

a network reading address queue for sequentially storing reading addresses input via said network interface and for storing an access sequence value of said reading addresses;

a network reading data queue for sequentially storing said memory access data read based on a sequence of said access sequence value and access address stored in said network reading address queue, said queue transmitting said stored memory access data to the network requesting memory access via said network interface;

a network writing address queue for sequentially storing writing addresses input via said network interface and for storing an access sequence value of said writing addresses; and a network writing data queue for sequentially storing writing data input via said network interface and for writing said stored writing data in said memory according to the sequence of said access sequence values of said reading addresses and said writing addresses.

3. A memory data path controller for a parallel processing computer system as claimed in claim 2, wherein said network reading address queue, network writing address queue, network reading data queue, and network writing data queue all are multi-staged.

4. A memory data path controller for a parallel processing computer system as claimed in claim 1, wherein said bus queue comprises:

a bus reading address queue for sequentially storing reading addresses input via said bus interface and for storing access sequence values of said reading addresses;

a bus reading data queue for sequentially storing said memory access data read based on a sequence of said access sequence values stored in said bus reading address queue, said queue transmitting said stored memory access data to the processor requesting memory access via said bus interface;

a bus writing address queue for sequentially storing writing addresses input via said bus interface and for storing access sequence values of said writing addresses; and a bus writing data queue for sequentially storing writing data input via said bus interface and for writing said stored writing data in said memory according to a sequence of said access sequence values stored in said bus writing address queue.

5. A memory data path controller for a parallel processing computer system as claimed in claim 4, wherein said bus reading address queue, bus writing address queue, bus reading data queue, and bus writing data queue all are multi-staged, equal to or greater than the number of processors capable of requesting memory access via said bus interface.

6. A memory data path controller for a parallel processing computer system as claimed in claim 1, wherein said dual path controller means comprises:

a queue counter for detecting whether or not said network queue or bus queue is full;

a queue controller for recognizing a memory access request input via said network interface or bus interface and, only if said queue counter is not full, for controlling to perform data transmission/reception between said network queue and network interface and between said bus queue and bus interface;

an access sequencer for providing a sequence of memory accesses between said network queue and bus queue based on a sequence of memory access requests; and a queue arbiter for accepting an arbitration request from said queue controller and for arbitrating so that said network queue or bus queue accesses said memory and reads or writes data according to priority of the access sequence of said access sequencer.

7. A memory data path controller for a parallel processing computer system as claimed in claim 6, wherein for said network queue's reading and writing, two queues are allocated, and for said bus queue's writing and reading, two queues are allocated so that a remaining number capable of the respective reading/writing accesses is counted.

* * * * *